United States Patent [19]
Filice et al.

[11] Patent Number: 5,325,769
[45] Date of Patent: Jul. 5, 1994

[54] WALNUT CRACKING MECHANISM

[75] Inventors: Michael P. Filice, Orinda; Robert Lemos, Salida; Robert P. Baker, Hughson, all of Calif.

[73] Assignee: Filembak, Inc., Orinda, Calif.

[21] Appl. No.: 950,895

[22] Filed: Sep. 25, 1992

[51] Int. Cl.⁵ .............................................. A23N 5/00
[52] U.S. Cl. ...................................... 99/571; 99/574; 99/580; 99/581
[58] Field of Search ............... 99/568, 571, 572–576, 99/577–579, 580, 583, 582, 581; 426/481, 482

[56] References Cited

U.S. PATENT DOCUMENTS

| | | | |
|---|---|---|---|
| 2,147,022 | 2/1939 | Formway | 99/581 |
| 2,288,191 | 6/1942 | Hayes | 99/577 |
| 2,353,841 | 7/1944 | McKinnis | 99/574 |
| 2,685,312 | 8/1954 | Mulvany et al. | 99/568 |
| 2,954,810 | 10/1960 | Bond | 99/574 |
| 3,871,275 | 3/1975 | Quantz | 99/571 |
| 4,096,795 | 6/1978 | Gonzalez | 99/494 |
| 4,182,233 | 1/1980 | Gonzalez | 99/494 |
| 4,201,126 | 5/1980 | Evans | 99/579 |
| 4,218,968 | 8/1980 | Livingston | 99/578 |
| 4,307,660 | 12/1981 | Clavel | 99/582 |
| 4,332,827 | 6/1982 | Quantz | 426/481 |
| 4,418,617 | 12/1983 | Quantz | 99/571 |
| 4,441,414 | 4/1984 | Quantz | 99/571 |
| 4,690,048 | 9/1987 | Namdari | 99/575 |
| 4,793,248 | 12/1988 | Frederiksen et al. | 99/576 |
| 4,925,691 | 5/1990 | Cimperman | 426/484 |

*Primary Examiner*—Timothy F. Simone
*Attorney, Agent, or Firm*—Bielen, Peterson & Lampe

[57] ABSTRACT

A mechanism for cracking nuts utilizing a rotating member including a plurality of cells. Each cell of the rotating member is sized to contain a single nut which is accessible through an entrance to the cell. The cell also includes a plate against which the walnut may rest. Each nut, if elongated, is oriented in each of the cells such that the long axis of the nut lies between the entrance and the plate of each cell. Cracking heads are employed in association with each of the cells such that any single cracking head is sized to move freely in and out of the entrance of each of the cells and may contact the nut within each cell. A striker or impact producing device imparts an impinging force to any of the cracking heads to crack the nut between the cracking head and plate within each of the cells of the rotating member.

22 Claims, 5 Drawing Sheets

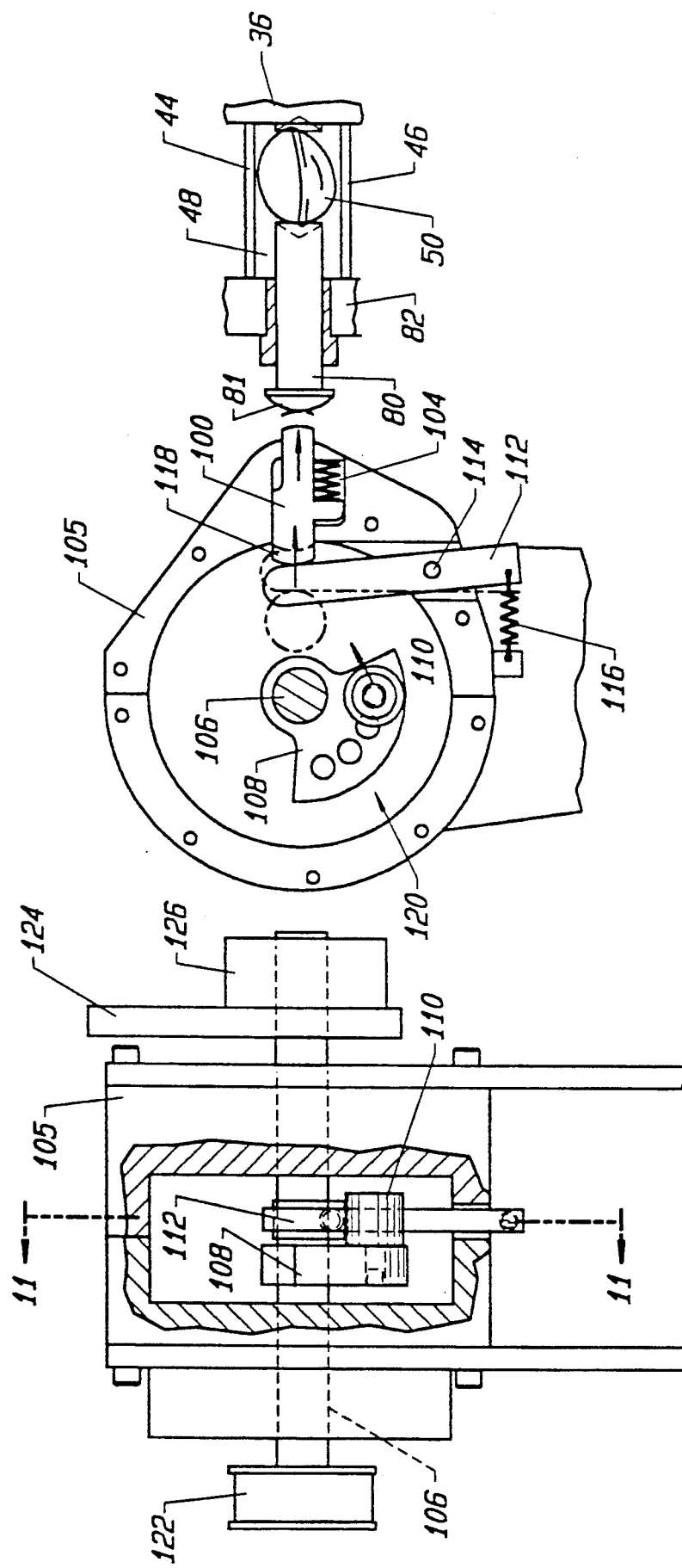

WALNUT CRACKING MECHANISM

BACKGROUND OF THE INVENTION

The present invention relates to a novel and useful mechanism for cracking nuts, such as walnuts.

The processing of walnuts requires complete and careful cracking of the shells to prevent breakage of the meat into small pieces as well as the production of ground meal. In addition, shell fragments, which must be eventually removed from the cracked walnuts, should be large in size to effect such removal.

In the past, walnuts have been manually cracked by a person wielding a hammer on an assembly line, one at a time. Such cracking technique has produced good results, but is slow, extremely labor extensive, and, consequently, quite expensive to achieve. Other devices for cracking walnuts have been proposed. For example, U.S. Pat. No. 2,147,022 describes a walnut cracking device which combines a brush and rolling mechanism to crack a walnut shell on a sharp edge of a draper. U.S. Pat. No. 2,685,312 cracks walnut shells using an electric charge between both ends of the whole walnut. U.S. Pat. No. 2,288,191 cracks multiple walnuts by squeezing walnuts between a cracker head bar and a prong holder using a hydraulically driven mechanism.

U.S. Pat. Nos. 3,871,275, 4,332,827, and 4,418,617 describe apparatuses for cracking pecans which utilize an anvil that moves under air pressure against a cracking hammer to crack the pecan. The anvil is returned by a spring to its position. U.S. Pat. Nos. 4,332,827 and 4,418,617 teach conveyors which lie intermediate the source of the pecans and the turret used to crack the same.

The mechanism most often used to crack walnuts in the industry is referred as to the "dragon" machine. Generally, the "dragon" utilizes concentric rotating cones which have different slopes. Walnuts are cracked at the closest point between the two cones. Although the "dragon" possesses a high capacity, it does a relatively poor job producing quality walnut meats. That is to say, less than 15% of the meats recovered are halves. In addition, the skin is removed from the meat which is an aesthetic disadvantage. Moreover, shells, and other fragments are ground into small particles which are difficult to remove from the finished product.

A high capacity nut cracking machine that may be used to crack walnuts without damaging the meat of the walnut would be a great advance in the food processing industry.

SUMMARY OF THE INVENTION

The present invention relates to a novel and useful method and mechanism for cracking nuts, which is especially applicable to cracking walnuts.

The mechanism of the present invention utilizes a rotating member or turret. The turret includes a plurality of open cells on the periphery thereof, each sized to contain a single nut such as a walnut. Individual cells are each constructed with a plate and an entrance to the cell. A pair of spanning rods define the cell such that only a single nut may occupy each cell. Nuts are fed into individual cells through a hopper mechanism.

Orienting means is also included in the present invention for positioning individual nuts in each of the cells. Orientation takes place such that the long axis of an elongated nut, such as a walnut, lies between the plate and the entrance to the cell. The orienting means may take the form of a pair of rotating spindles which are spaced to achieve such orientation. The spindles may be turned by a friction surface which is attached to a stationary frame element and, thus, does not rotate with the turret. In this manner, the walnuts are positioned for cracking along the long axis of the same.

A plurality of cracking heads are associated with each cell and positioned to move freely, back and forth, through the entrance to each of the cells. The cracking heads are each capable of contacting the walnut oriented within the cell. Loading means is also provided in the present mechanism to gently urge the cracking head into the individual cell and against the walnut oriented therein prior to cracking. Such loading means may take the form of fingers or springs which physically push each cracking head into each cell while the turret rotates.

To crack nuts in the loaded mode, each cracking head is forced against the walnut by impact means which imparts an impinging force. The impingement force may be adjusted to accommodate different sized walnuts. In one embodiment, the impact means includes a striker which is capable of advancing into individual cells and contacting each nut within a cell sufficient to crack the outer shell of the same. Actuating means is also providing for periodically advancing the striker. The actuating means is coordinated with the rotational position of the turret such that sequential alignment of the striker with each of the plurality of cracking head occurs. Thus, nuts within the cells of the turret are sequentially cracked by the striker. Means for periodically advancing the striker may include a rotating cam, and a cam follower motivated by the rotating cam. The cam follower may take the form of a lever which is spring loaded to return to an initial pivotal position. In addition, the striker may be spring loaded to return to a predetermined position in order to uniformly receive force imparted by the cam follower. The repositioning of the lever and striker occurs once during every revolution of the cam. A flywheel may be linked to the cam to rotate with the same and transfer the necessary momentum to each cracking head, sufficient to precisely crack the individual walnuts without damaging the meat within the same.

Clearing means may be included to urge the cracking head from the cell. A stop prevents complete passage of the cracking head into the cell. Such clearing means may take the form of a magnetic device which will achieve this end when each cracking head is formed or provided with a magnetic material.

The method of the present invention includes the steps of providing a rotating member having a plurality of cells each sized to contain a single nut. Each cell of the rotating member is further provided with a block and an entrance to the same. The elongated nut is placed in each one of the cells and oriented such that the nut lies between the block and the entrance to the cell. If the nut is not elongated, orientation is not necessary. A cracking head is provided and sized to move in and out the cell entrance and is capable of contacting the nut within the cell. The impact is imparted to each cracking head to crack the shell of the nut by forcing the same between the cracking head and the block within the cell.

It may be apparent that a novel and useful method and mechanism for cracking nuts have been described.

It is therefore an object of the present invention to provide a method and mechanism for cracking nuts which actively orients an elongated nut along its dimension of elongation and imparts a cracking force therealong.

It is another object of the present invention to provide a method and mechanism for cracking nuts which utilizes a plurality of cracking heads that extend into individual cells on a turret and are actuated by a striker which is periodically advanced to produce an impingement force on the nut.

Yet another object of the present invention is to provide a method and mechanism for cracking nuts which produces very high quality meats, undamaged by the cracking process.

A further object of the present invention is to provide a method and mechanism for cracking nuts which leaves the cracked shells of the nut in relatively large sizes.

Yet another object of the present invention is to provide a method and mechanism for cracking nuts which matches the quality control of hand cracking and yet possesses a very high capacity.

Yet another object of the present invention is provide a method and mechanism for cracking walnuts which produces meats which are in halves and wholes without having the skin removed from the same.

A further object of the present invention is to provide a method and mechanism for cracking nuts which eliminates recracking of the nuts, to a large degree.

The invention possesses other objects and advantages which will become apparent as the specification continues.

BRIEF DESCRIPTION OF THE DRAWINGS

FIG. 10 is a side elevational view of the striker mechanism of the present invention.

FIG. 11 is a sectional view taken along line 11—11 of FIG. 10.

Figure 1:
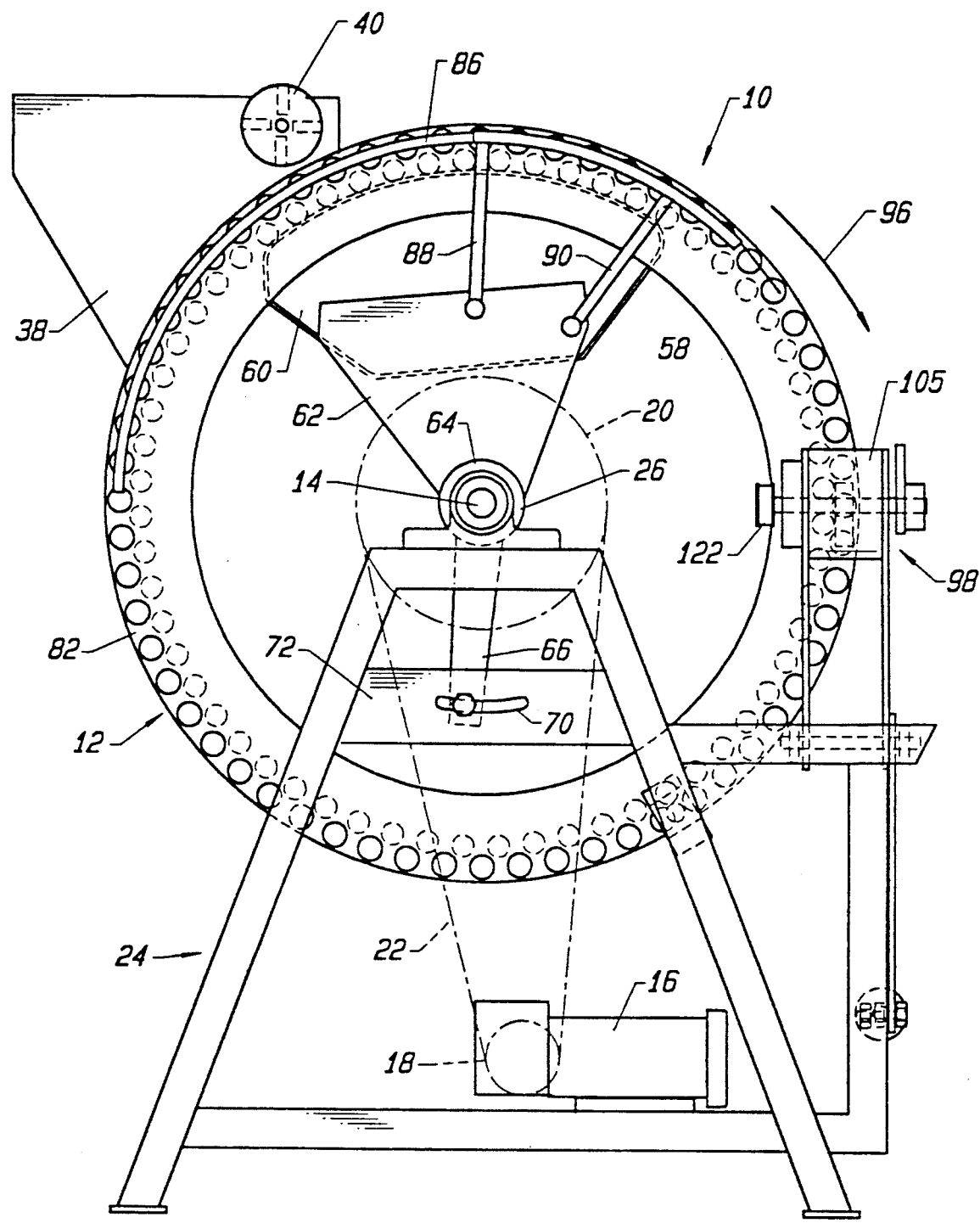
FIG. 1 is a side elevational view of the mechanism of the present invention used to crack walnuts.

For a better understanding of the invention reference is made to the following Detailed Description of the Preferred Embodiments thereof which should be referenced to the herein above described drawings.

DETAILED DESCRIPTION OF THE PREFERRED EMBODIMENTS

Various aspects of the present invention will evolve from the following Detailed Description of the Preferred Embodiments thereof which should be taken in conjunction with the prior described drawings.

The invention as a whole is depicted in the drawings by reference character 10. The nut cracking mechanism 10, FIG. 1, includes as one of its elements, a rotatable member or turret 12. Rotatable member 12 turns about axle 14 through the power afforded by motor 16 transferred to pulleys 18 and 20. Pulleys 18 and 20 and timing belt 22 are mounted to a frame 24 by a pair of bearings 26 and 28, FIGS. 1 and 2.

Figure 3:
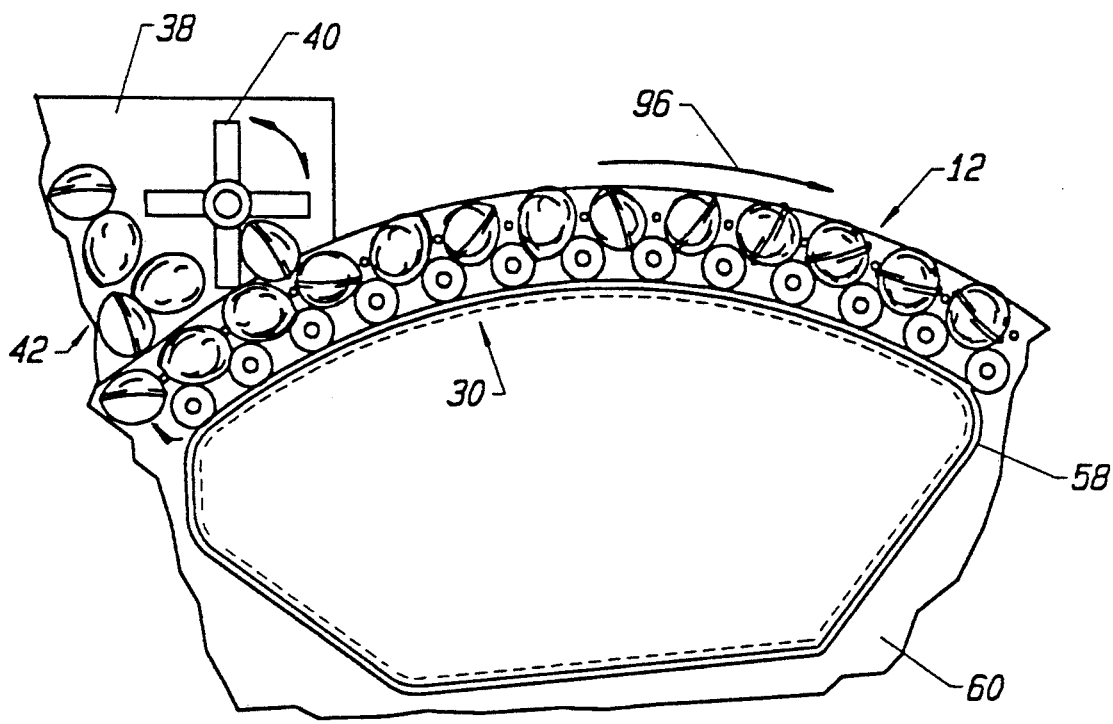
FIG. 3 is a broken enlarged view of the hopper feed mechanism of the present invention.

Circular turret 12 is formed with a plurality of cells 30 on the peripheral area. Such plurality of cells lie in parallel rows 32 and 34 separated by a strengthing hoop 36. A hopper 38 is mounted to the frame 24 or supported separately from frame 24 in the position shown in FIG. 1, so as not to interfere with the rotation of turret 12. A paddle 40 within hopper 38 forces individual walnuts of multiplicity of walnuts 42 into each cell of multiplicity of cells 30, FIG. 3. Paddle 40 may be turned by a separate motor or through linkage to motor 16 (not shown). As depicted in the embodiment shown in FIG. 3, paddle 40 and turret 12 turn in a clockwise direction.

Figure 9:
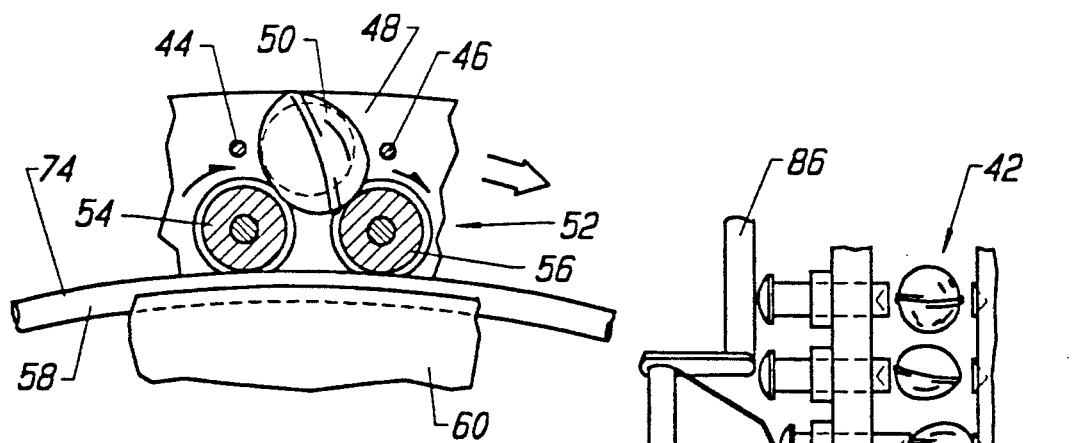
FIG. 9 is a sectional view taken along line 9—9 of FIG. 4.

Referring now to FIG. 9, it may be observed that each cell of turret 12 is defined by a pair of rods such as rods 44 and 46 which extends transversely relative to turret 12. Cell 48 formed thereby is large enough to fit only a single walnut such as walnut 50. Where the nut being cracked is elongated, orienting means 52 is employed to place the elongated nut such that the long axis or dimension of elongation lies across turret 12. Orienting means 52 is depicted in FIG. 9 as including a pair of turning members 54 and 56 which are spindle-shaped. Turning members 54 and 56 rotate by contact with band 58 which fixes to support 60. Referring now to FIG. 1, flange 62 holds support 60 to the bushing 64 which is held by frame 24. Arm 66 extends from bushing 64 to provide adjustment to support 60 through bolt 68 and slot 70 of support member 72. Thus, stationary band 58 rotates turning members 54 and 56 by contact between the band friction surface 74 and the outer surfaces of turning members 54 and 56. Band 58 may be composed of elastomeric material such as rubber, plastic, and the like, in this regard.

Walnuts are more easily cracked when a force is placed at the long axis between the ends of the same. It is known that there is a larger air space within the shell of the walnut at the ends which results in less damage to the meat and the production of larger shell fragments. The latter advantage aids in the eventual removal of shell fragments from the meat.

Figure 4:
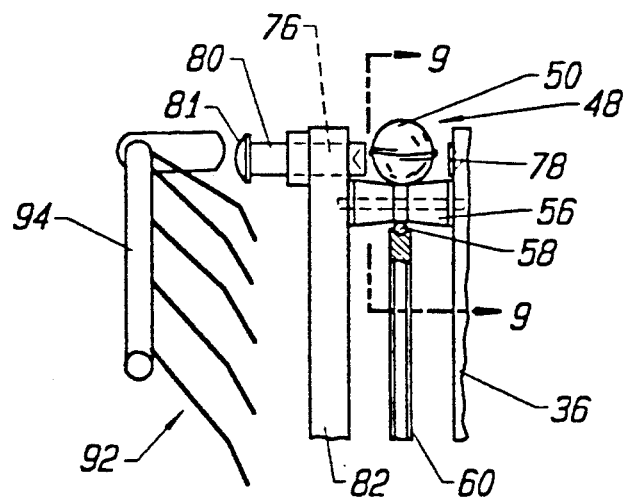
FIG. 4 is an enlarged partial end view of the mechanism of the present invention showing the fingers employed to force the cracking heads inwardly toward the cells of the turret.
Figure 5:
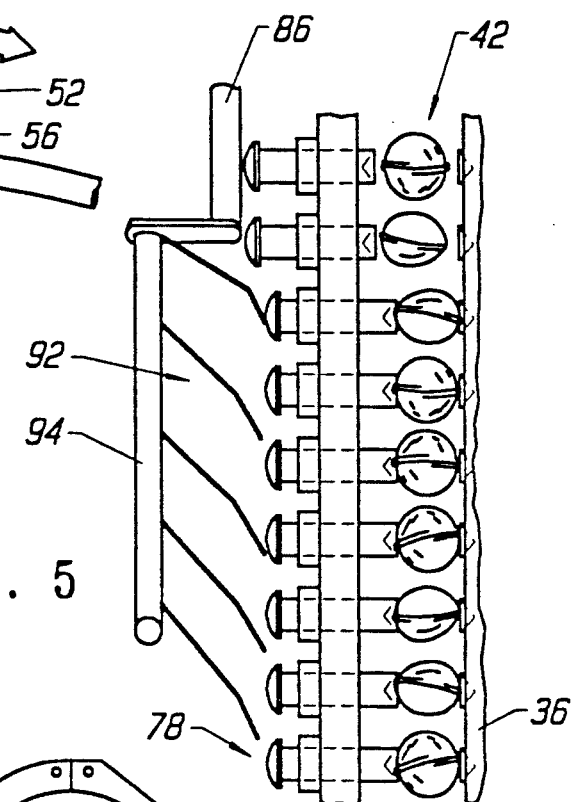
FIG. 5 is a top plan view of the portion of the mechanism depicted in FIG. 4.

Each cell, such as cell 48 of plurality of cells 30, includes an entrance aperture 76 and a block or plate 78 which lie on either side of a walnut, such as walnut 50 found within cell 48, FIG. 4. A plurality of cracking heads 78 are positioned in each aperture of each of the plurality of cells 30. Cracking heads 78 may be constructed of steel or other hardened material, which is preferably magnetic. For example, cracking head 80, FIG. 4, is free to slide in and out of aperture 76 and into cell 48. Cap 81 prevents cracking head 80 from traveling beyond a certain distance within cell 48. Plurality of cracking heads 78 are supported by a plate 82 on turret 12 with respect to row 32 and another plate 84 with respect to row 34 of cells. Guide rod 86, FIG. 1, prevents plurality of cracking heads 78 from exiting the appatures on plate 82 during the loading of walnuts 42 from hopper 38. Support rods 88 and 90 hold guide rod 86 to flange 62. Turning to FIG. 5, it may be observed that spring fingers 92 connected to extension 94 of guide rod 86 gently push each of the plurality of cracking heads 78 against each of the plurality of walnuts 42 within the plurality of cells 30 as turret turns, directional arrow 96, FIGS. 1 and 3.

Figure 6:
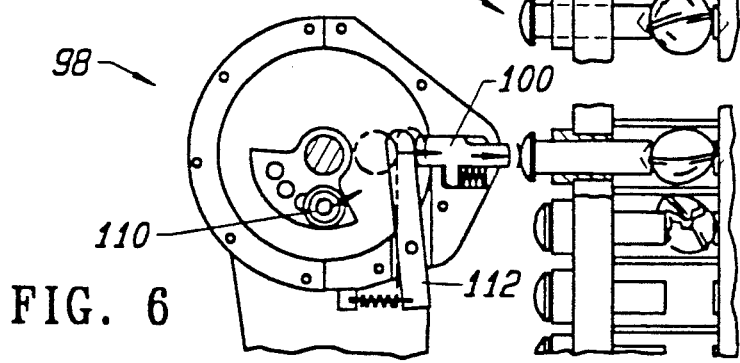
FIG. 6 is a partial enlarged front elevational view of the mechanism of the present invention showing the striker assembly actively cracking walnuts.
Figure 8:
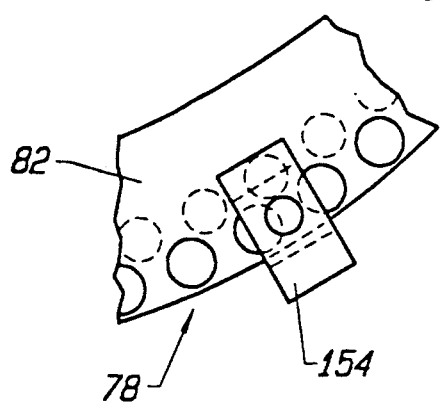
FIG. 8 is a side view of the spring mechanism depicted in FIG. 7.

Impact means 98 is also found in the present invention. Impact means 98 imparts an impingement force on any one of the plurality of cracking heads 78, FIGS. 6, 10, and 11. Impact means 98 includes a striker 100 which lies in the vicinity of cracking head 80 found in cell 48. It should be realized, that impact means 98 having striker mechanism 128 is utilized with respect to the walnuts within the plurality of cells 30 within row 32. Another striker 102 acts on the plurality of cracking heads 78 found on row of cells 34 and uses a similar mechanism 130, FIG. 2. Returning to FIG. 11, it should be noted that striker 100 is spring biased away from contact with cap 81 of cracking head 80. Striker 82 lies within a cavity 104 of housing 105. Rotating shaft 106 turns an arm 108 which includes a cam surface 110. Cam surface 110 makes contact with a cam follower 112 in the form of a lever. Lever 112 pivots at pivot point 114 and is spring biased by spring 116 away from the end 118 of striker 100 which contacts lever 112. Multiplicity of openings 120 are used to reposition cam surface 110 on arm 108 in order to adjust the timing and travel of striker 100 and, consequently, cracking head 80. Shaft 106 is connected to a pulley 122 which is turned by timing belts and other linkage (not shown) to motor 16. Flywheel 124 lies at one end of shaft 106 is held thereto by fastener 126. Flywheel 124 may be eccentric to deliver momentum which coincides with the movement of lever 112, striker 100, and contacting cracking head 80 In this manner, maximum momentum is transferred to cracking head 80 in order to efficiently crack nut 50 within cell 48.

Figure 2:
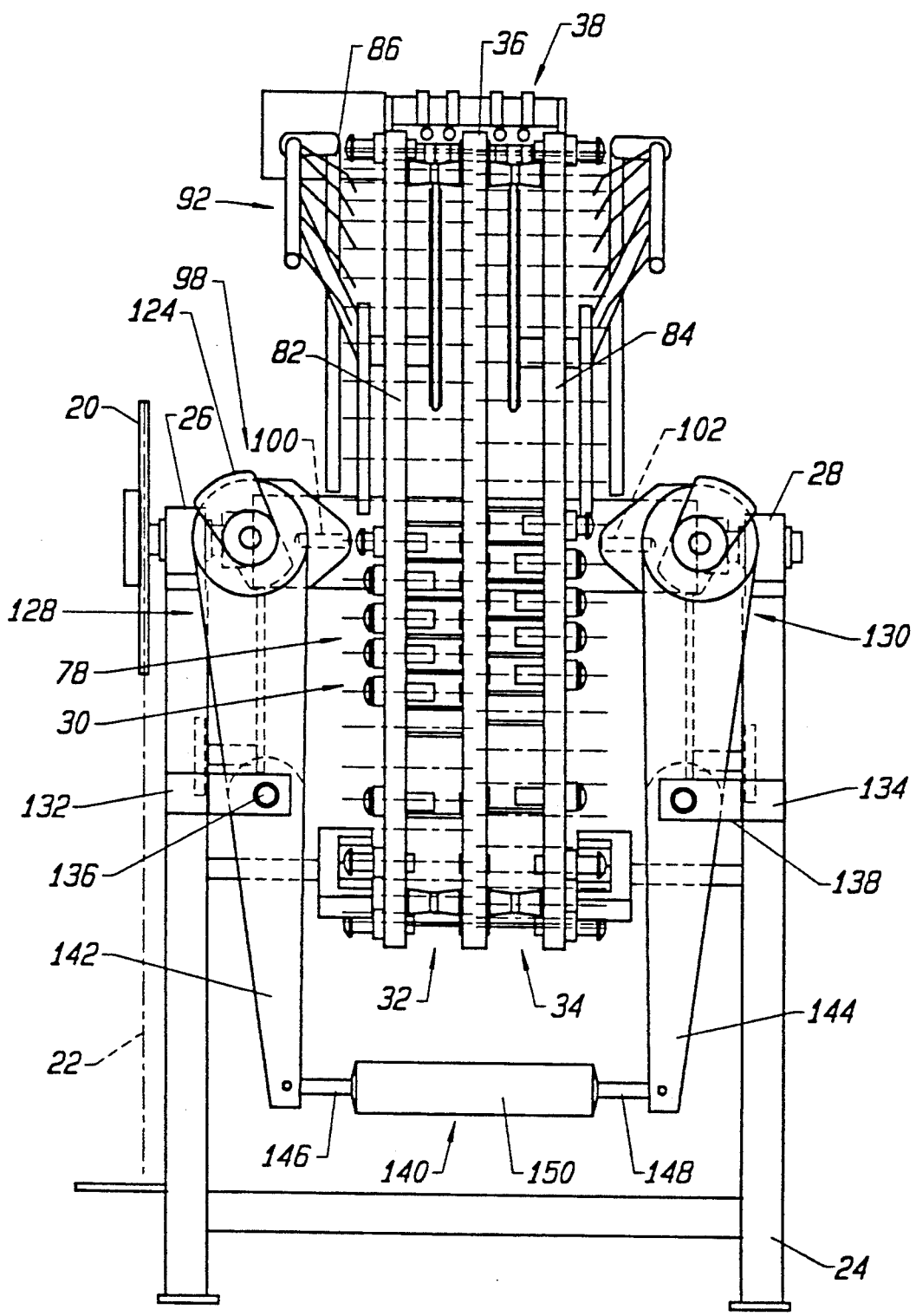
FIG. 2 is a front elevational view of the mechanism of the present invention.

With reference to FIG. 2, it may be observed that striker mechanisms 128 and 130 are pivotally attached to structural members 132 and 134 which are connected to frame 24. Pivot points 136 and 138 serve as a portion of impact absorbing mechanism 140. Arms 142 and 144 terminate in rods 146 and 148 which extend into air cylinder 150 thus serving to dampen the pivoting of arms 142 and 144 around pivot points 136 and 138 during operation of striker mechanisms 128 and 130.

Figure 7:
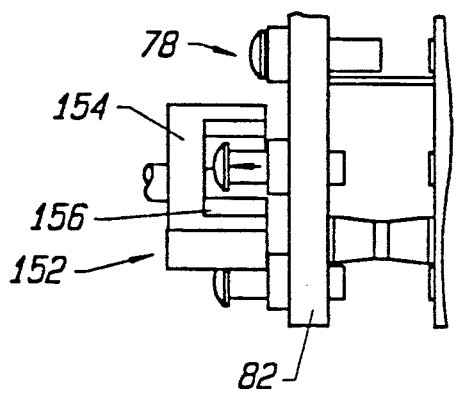
FIG. 7 is a partial enlarged front elevational view of the mechanism of the present invention depicting the magnetic spring mechanism for urging the cracking heads from the individual cells of the turret.

With reference to FIG. 7, it may be seen that plurality of cracking heads 78 are directed outwardly from the plurality of cells 30 by clearing means 152. Clearing means 152 includes a permanent magnetic 154 and a slot 156 through which each cracking head rides. As depicted in FIG. 7, each cracking head is pulled out or essentially cleared from the plurality of cells to prevent interference when another walnut enters one of the plurality of cells 30.

In operation, multiplicity of walnuts 42 are placed in hopper 38 and distributed into each cell of plurality of cells 30 by paddle 40 as turret 12 turns. Orienting means 52 spins the individual walnuts, such as walnut 50 within cell 48 until each nut is oriented along its long axis. Further turning of rotatable member 12 stops the orienting phase and permits plurality of fingers 92 to gently push each of the plurality of cracking heads 78 into each of the individual cells 30 against a single walnut now found in each cell, FIG. 5. At this point, further rotation of turret 12 brings the walnut and cracking head such as cracking head, 80 into alignment with striker 100. Impact means 98 is timed such that striker 100 will impinge against cracking head 80 through the cam mechanism 110, 112, depicted most clearly in FIG. 11. After impingement, lever arm 112 and striker 100 are retracted until the next cracking head is in place. The meat and the shell fragments of the plurality of nuts 42 will then fall from turret 12 when turret rotates downwardly. The meet and shell fragments are then separated by conventional means. Clearing means 152 will retract each of the plurality of cracking heads 78 until fingers 92 again reload the cracking head 78 against nuts 42 in each cell. It has been found that mechanism 10 produces a very high quality meat from walnuts in the form of wholes or halves unknown to the prior art devices.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A mechanism for cracking elongated nuts which is especially applicable to cracking walnuts, comprising:
   a. a rotating member, said rotating member including a plurality of cells, each cell thereof being sized to contain a single elongated nut, each cell further including a block and an entrance to said cell, each block being capable of contacting a nut;
   b. orienting means for positioning a nut in each of said cells such that the dimension of elongation of the nut lies between said block and said entrance to each of said cells;
   c. a plurality of cracking heads each associated with each of said cells, each of the cracking heads being sized to move in and out of said entrance of each of said cells and being capable of contacting the elongated nut in each of said cells; and
   d. impact means for imparting an impingement force to any of said plurality of cracking heads, said impact means comprising a striker capable of advancing and contacting any said plurality of cracking heads, and actuating means for periodically advancing said striker commensurate with the rotation of said rotating member to effect sequential alignment of said striker with said plurality of cracking heads.

2. The mechanism of claim 1 which further comprises a hopper for delivering nuts to each of said plurality of cells.

3. The mechanism of claim 1 in which said actuating means for periodically advancing said striker includes a rotating cam and a cam follower motivated by said rotating cam, said cam following being capable of impinging on said striker.

4. The mechanism of claim 3 in which said cam follower is a lever.

5. The mechanism of claim 4 which additionally includes a flywheel linked to rotate with said rotating cam.

6. The mechanism of claim 3 in which said cam follower is a lever.

7. The mechanism of claim 6 which additionally includes a flywheel linked to rotate with said rotating cam.

8. The mechanism of claim 7 in which said orienting means comprises a plurality of pairs of turning elements each capable of simultaneously contacting a nut, each of said pair of turning elements being located in a cell of said plurality of cells, and activation means for turning each of said turning elements.

9. The mechanism of claim 8 in which said activating means includes a stationary friction surface fixed relative to said rotating member, said stationary function surface being capable of contacting each pair of said plurality of pairs of turning elements.

10. The mechanism of claim 9 which further comprises a hopper for delivering nuts to each of said plurality of cells.

11. The mechanism of claim 10 which additionally comprises clearing means for urging each of said cracking heads outwardly from each of said cells and stop means for preventing complete removal of each of said cracking heads from each of said cells.

12. The mechanism of claim 11 in which said clearing means includes forming each cracking head with magnetic material, and a magnetic capable of urging each cracking head from each cell.

13. The mechanism of claim 12 which additionally comprises loading means for urging each of said cracking heads inwardly to each of said cells.

14. The mechanism of claim 13 in which said loading means comprises a finger capable of contacting and urging each cracking head inwardly to each of said cells.

15. A mechanism for cracking elongated nuts which is especially applicable to cracking walnuts, comprising:
   a. a rotating member, said rotating member including a plurality of cells, each cell thereof being sized to contain a single elongated nut, each cell further including a block and an entrance to said cell, each block being capable of contacting a nut;
   b. orientating means for positioning a nut in each of said cells such that the dimension of elongation of the nut lies between said block and said entrance to each of said cells, said orienting means comprising a plurality of pairs of turning elements each capable of simultaneously contacting a nut, each of said pair of turning elements being located in a cell of said plurality of cells, and activation means for turning each of said turning elements;
   c. a plurality of cracking heads each associated with each of said cells, each of the cracking heads sized to move in and out of said entrance of each said of said cells and being capable of contacting the elongated nut in each of said cells; and
   d. impact means for imparting an impingement force to any of said plurality of cracking heads.

16. The mechanism of claim 15 in which said activating means includes a stationary friction surface fixed relative to said rotating member, said stationary function surface being capable of contacting each pair of said plurality of pairs of turning elements.

17. A mechanism for cracking elongated nuts which is especially applicable to cracking walnuts, comprising:
   a. a rotating member, said rotating member including a plurality of cells, each cell thereof being sized to contain a single elongated nut, each cell thereof being sized to contain a entrance to said cell, each block being capable of contacting a nut;
   b. orientating means for positioning a nut in each of said cells such that the dimension of elongation of the nut lies between said block and said entrance to each of said cells;
   c. a plurality of cracking heads each associated with each of said cells, each of the cracking heads being sized to moved in an out of said entrance of each of said cells and being capable of contacting the elongated nut in each of said cells;
   d. impact means for imparting an impingement force to any of said plurality of cracking heads;
   e. clearing means for urging each of said cracking heads outwardly from each of said cells; and
   f. stop means for preventing complete removal of each of said cracking heads from each of said cells.

18. The mechanism of claim 17 in which said clearing means includes forming each cracking head with magnetic material, and a magnetic capable of urging each cracking head from each cell.

19. The mechanism of claim 17 which additionally comprises loading means for urging each of said cracking heads inwardly to each of said cells.

20. The mechanism of claim 19 in which said loading means comprises at least one finger capable of contacting and urging each cracking head inwardly to each of said cells.

21. A mechanism for cracking nuts comprising:
   a. a rotating member, said rotating member including a plurality of cells, each cell thereof being sized to contain a single elongated nut, each cell further including a block and an entrance to said cell, each block being capable of contacting a nut;
   b. a plurality of cracking heads each associated with each of said cells, each of the cracking heads sized to move in an out of said entrance of each of said cells and being capable of contacting the nut in each of said cells;
   c. impact means for imparting an impingement force to any of said plurality of cracking heads, said impact means including a striker capable of advancing and contacting any said plurality of cracking heads, and actuating means for periodically advancing said striker commensurate with the rotation of said rotating member to effect sequential alignment of said striker with said plurality of cracking heads.

22. The mechanism of claim 21 in which said actuating means for periodically advancing said striker includes a rotating cam and a cam follower motivated by said rotating cam, said cam follower being capable of impinging on said striker.

* * * * *